United States Patent
Jeevanantham et al.

(10) Patent No.: US 9,854,126 B2
(45) Date of Patent: Dec. 26, 2017

(54) SYSTEM AND METHOD FOR HANDLING BLANK PAGES DURING DOCUMENT PRINTING OR COPYING

(71) Applicant: XEROX CORPORATION, Norwalk, CT (US)

(72) Inventors: Kalpanadevi Jeevanantham, Chennai (IN); Sainarayanan Gopalakrishnan, Chennai (IN); Raja Dorairaj, Coimbatore (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/946,536

(22) Filed: Nov. 19, 2015

(65) Prior Publication Data

US 2017/0149999 A1   May 25, 2017

(51) Int. Cl.
*G06F 15/00*   (2006.01)
*G06K 15/00*   (2006.01)
*G06K 1/00*   (2006.01)
*H04N 1/32*   (2006.01)

(52) U.S. Cl.
CPC ..... *H04N 1/32133* (2013.01); *H04N 1/32144* (2013.01)

(58) Field of Classification Search
CPC ........... H04N 1/32133; H04N 1/32144; G06K 15/02; G06F 3/1297
USPC ....................... 358/1.1, 1.18, 1.14, 3.27, 3.28
See application file for complete search history.

(56) References Cited

U.S. PATENT DOCUMENTS

| | | | | |
|---|---|---|---|---|
| 5,146,554 | A * | 9/1992 | Statt | G06K 15/128 |
| | | | | 345/428 |
| 8,724,182 | B2 | 5/2014 | Labois et al. | |
| 2003/0056177 | A1* | 3/2003 | Nara | G06F 17/212 |
| | | | | 715/255 |
| 2006/0023236 | A1* | 2/2006 | Sievert | G06K 9/00469 |
| | | | | 358/1.12 |
| 2016/0255222 | A1* | 9/2016 | Sakata | H04N 1/00482 |
| 2017/0054857 | A1* | 2/2017 | Lea | H04N 1/387 |

* cited by examiner

*Primary Examiner* — Douglas Tran
(74) *Attorney, Agent, or Firm* — Caesar Rivise, PC

(57) ABSTRACT

A system is provided for marking intentionally blank pages in a document. The system includes a processor that processes a document in an electronic form; a blank page detection routine that is run by the processor, the blank page detection routine being configured to detect a blank plank page in the document; and a blank page indicating routine that is run by the processor, the blank page indicating routine being configured to indicate with an indication that the blank page is an intentionally blank page. The indication is configured to be read by a marking device such that the marking device marks the blank page as intentionally blank.

20 Claims, 2 Drawing Sheets

SYSTEM AND METHOD FOR HANDLING BLANK PAGES DURING DOCUMENT PRINTING OR COPYING

BACKGROUND

Disclosed herein is a system and method for marking intentionally blank pages as such in a document.

Embodiments of the disclosure are well suited for marking intentionally blank pages in documents that are printed or in documents that are copied.

SUMMARY

The concept of detecting blank pages during a copy job or a print job is very useful, especially during the printing or copying of legal or regulatory documents. An author of the document may want to indicate to the reader that the blank page is deliberately blank and that it is not an omission. However, in some systems when a blank page is detected the blank page is not printed and is skipped completely. This removes the separation in the final print product that was originally desired to be indicated by the presence of the blank page. This also removes the separation that is often necessary to start a new section of the document on the desired page for appearance purposes.

In some systems, a user needs to indicate manually and separately each blank page on which the user desires to include a blank page identifier. Identifiers can be text such as, for example, "This page is intentionally blank" or can be a watermark or other printed identifier. This process can be tedious and can easily lead to errors due to the user having to manually indicate which pages require the identifier.

In embodiments of the disclosure, when a user submits a copy or print job including one or more blank pages in the original, some systems can detect the blank pages and automatically mark those pages as intentionally left blank using annotation or watermark options.

In embodiments of the disclosure, the blank pages can be automatically detected using an algorithm or pattern and the system can provide the user an option to identify the blank pages with a printed identifier.

By configuring annotation or watermark settings, when such blank pages get detected during copy or print jobs, the system allows marking these pages with printing an annotation text such as, for example, "This page is intentionally left blank", or another identifier.

An embodiment of the disclosure may include a system for marking intentionally blank pages in a document. The system includes a processor that processes a document in an electronic form; a blank page detection routine that is run by the processor, the blank page detection routine being configured to detect a blank plank page in the document; and a blank page indicating routine that is run by the processor, the blank page indicating routine being configured to indicate with an indication that the blank page is an intentionally blank page. The indication is configured to be read by a marking device such that the marking device marks the blank page as intentionally blank.

In some embodiments of the disclosure the blank page indicating routine is part of a driver of the marking device, the driver being a set of configuration commands that are associated with the marking device and the marking device's capabilities.

In some embodiments of the disclosure the blank page indicating routine includes a user answerable option to automatically mark the blank page as intentionally blank, the user's answer to the option being stored in the driver for all future documents.

In some embodiments of the disclosure the blank page indicating routine includes a user answerable option to mark the blank page as intentionally blank, the user answerable option being presented to the user when the document is saved or printed.

In some embodiments of the disclosure the marking device and the processor are parts of a photocopier, and the photocopier scans the document in physical form and converts it to the electronic form. And in some embodiments of the disclosure the blank page indicating routine includes a user answerable option to mark the blank page as intentionally blank, the user answerable option being presented to the user each time a document is copied.

Another embodiment of the disclosure may include a method for marking intentionally blank pages in a document. The method includes processing a document in an electronic form with a processor; detecting a blank page in the document with a blank page detection routine that is run by the processor; and indicating with an indication that the blank page is an intentionally blank page with a blank page indicating routine that is run by the processor. The indication is configured to be read by a marking device such that the marking device marks the blank page as intentionally blank.

DETAILED DESCRIPTION

The concept of detecting blank pages during a copy job or a print job is very useful, especially during the printing or copying of legal or regulatory documents. An author of the document may want to indicate to the reader that the blank page is deliberately blank and that it is not an omission. However, in some systems when a blank page is detected the blank page is not printed and is skipped completely. This removes the separation in the final print product that was originally desired to be indicated by the presence of the blank page. This also removes the separation that is often necessary to start a new section of the document on the desired page for appearance purposes.

In some systems, a user needs to indicate manually and separately each blank page on which the user desires to include a blank page identifier. Identifiers can be text such as, for example, "This page is intentionally blank" or can be a watermark or other printed identifier. This process can be tedious and can easily lead to errors due to the user having to manually indicate which pages require the identifier.

In embodiments of the disclosure, when a user submits a copy or print job including one or more blank pages in the original, some systems can detect the blank pages and automatically mark those pages as intentionally left blank using annotation or watermark options.

For the purposes of this disclosure, a blank page is defined as a page containing no information. Blank pages can be automatically detected using an algorithm or pattern. This can be determined by, for example, measuring pixel intensity variation in the scanned image for a copy or scan job and in the page's RIP (raster image processor) image for a print job. The information can be measured, for example, by an entropy or projection profile. In particular embodiments, the header and footer areas can be excluded from the region measured to determine whether or not a page is blank. In particular embodiments, a watermark is not considered information when determining whether or not a page is blank.

In embodiments of the disclosure, the system can provide the user an option to identify the blank pages with a printed identifier.

By configuring annotation or watermark settings, when such blank pages get detected during copy or print jobs, the system allows marking these pages with printing an annotation text such as, for example, "This page is intentionally left blank", or another identifier.

Figure 1:
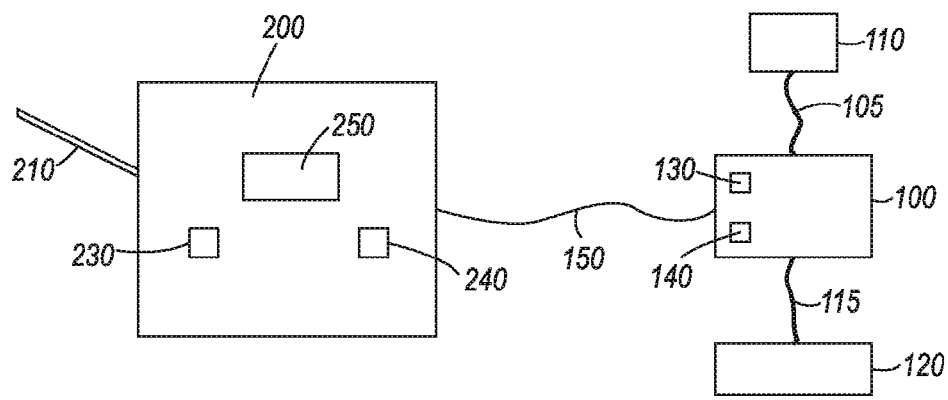
FIG. 1 is a schematic view of a system in accordance with embodiments of the disclosure.

FIG. 1 shows a schematic view of an example of a system in accordance with embodiments of the disclosure. In FIG. 1, a processor 100 is capable of running various routines such as, for example the blank page detection and blank page indicating routines discussed above. Processor 100 is connected by a wired or wireless connection 105 to a monitor 110 and by a wired or wireless connection 115 to a keyboard or other entry device 120. In this example, the blank page detection routine is represented by box 130 and the blank page indicating routine is represented by box 140.

Processor 100 is connected to a marking device, in this example a printer, 200 by a wired or wireless connection 150. In embodiments marking device 200 is a photocopier or other copier that includes a blank page detection routine 230 and a blank page indicating routine 240 in, or connected to, copier 200.

Marking device/copier 200 has an output tray 210 for holding pages output by marking device/copier 200. Marking device/copier 200 also includes a marking unit 250 that marks the pages with the text or other identifier.

In the case of a copier in accordance with embodiments of the disclosure, a paper document can be fed into the copier as usual but the blank page detection routine detects blank pages and either alerts the user to their presence or automatically adds a marking to the blank pages. In the case of alerting the user to the presence of blank pages, the user has the option to add or to not add a marking to the blank pages. If markings are to be added, the user may be presented with options as to what the marking is. For example, the options may include different text markings and/or different watermarks. In particular embodiments, the copier (or the printer if applicable) can be set to always add markings to blank pages. In particular embodiments, the markings can be a company logo as either text or as a watermark.

In particular embodiments of the disclosure the blank page indicating routine automatically indicates that the blank pages are to be marked. This can be set as a default in the blank page indicating routine as either mark or don't mark, and can be changeable by a user. The level of authority needed by change this setting can be limited so that normal users cannot change the setting. In this way, all blank pages will be marked as intentionally blank.

Figure 2:
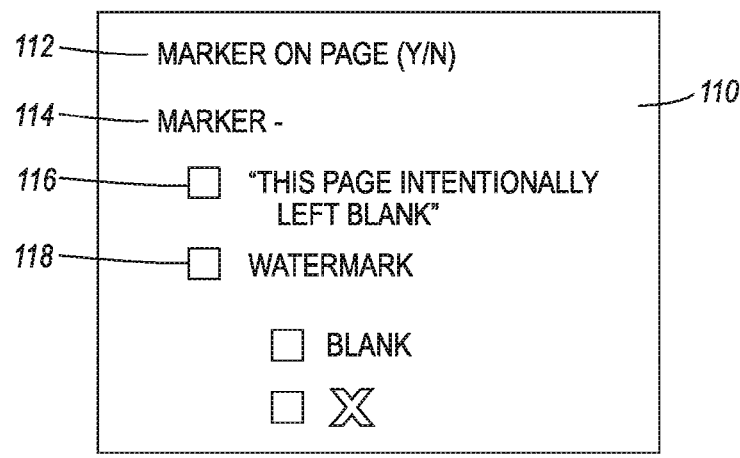
FIG. 2 is a schematic view of a user interface in accordance with embodiments of the disclosure.

In particular embodiments, a user is given an option to include the blank page indicia on the detected blank pages. FIG. 2 shows an example of a user interface through which a user can choose to include the blank page indicia on the blank pages. In FIG. 2, monitor 110 presents at 112 the question to the user of whether a blank page marker should be included on blank pages. If question 112 is answered affirmatively then the user is required to indicate whether the marker should be text 116 or a watermark 118 In this example, if watermark is chosen then two choices of the watermark are presented. Numerous options can be presented for both different text and different watermark markers.

The blank page detection routine and the blank page indicating routine can be located in the processor in, for example, a word processor program, or can be located in a driver such as, for example, a print driver. In particular embodiments, the blank page detection routine and the blank page indicating routine can be located in different locations. For example, the blank page detection routine can be located in the word processing program and the blank page indicating routine can be located in a print driver or in a printer/copier.

Figure 3:
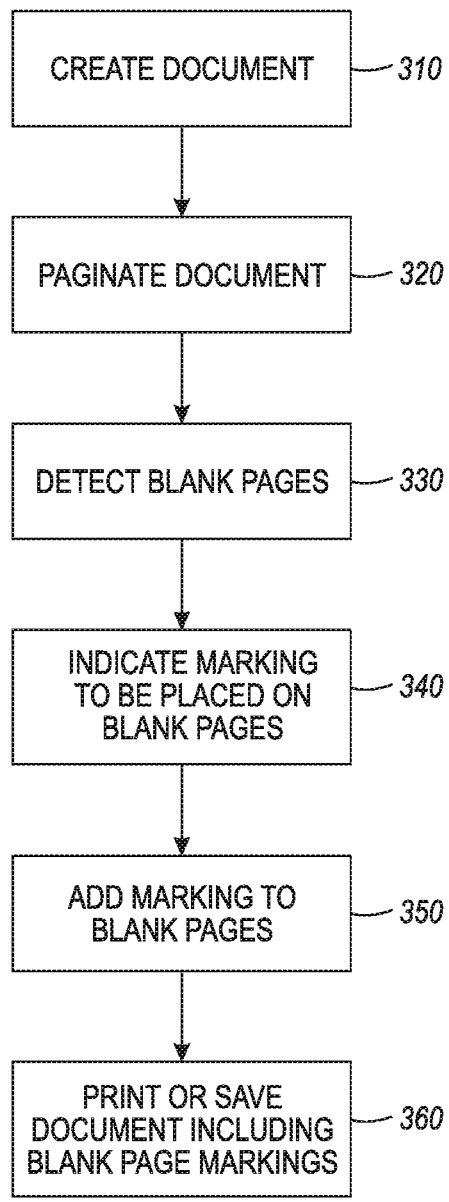
FIG. 3 shows an example of a method in accordance with embodiments of the disclosure.

FIG. 3 shows an example of a method in accordance with embodiments of the disclosure. In FIG. 3, at 310 a document is created by, for example, a word processing program. At 320 the document is paginated by, for example, either the word processing program or a pagination routine in a processor or a printer/copier. At 330 blank pages in the document are detected. The blank page detection can take place in the word processing program or in a blank page detection routine in a processor or a printer/copier. At 340 it is determined whether blank pages will be marked as intentionally left blank and, if so, what marking will be added to the blank pages. If it is determined that no markings will be added to the blank pages, then the process stops and normal printing/copying proceeds. If it is determined that markings will be added to the blank pages, then the process proceeds to 350. At 350 the markings are added to the blank pages. At 360 the document is printed or saved including the blank page markings.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for marking intentionally blank pages in a document, the system comprising:
   a processor that processes a document in an electronic form;
   a blank page detection routine that is run by the processor, the blank page detection routine being configured to detect a blank plank page in the document;
   in response to a detected blank plank page in the document, then determining whether the detected blank page will be marked as intentionally left blank;
   in response to the determination that the detected blank plank page will be marked as intentionally left blank, then causing the processor to run a blank page indicating routine to indicate with an indication on the document that the blank page is an intentionally blank page, wherein the indication is configured to be read by a marking device such that the marking device marks the blank page as intentionally blank; and
   in response to the determination that the detected blank plank page will not be marked as intentionally left blank, then causing the processor to submit the detected blank page devoid of an indication that the marking device marks the blank page as an intentionally blank page.

2. The system of claim 1, further comprising the marking device that reads the indication and marks the blank page as intentionally blank.

3. The system of claim 2, wherein the blank page indicating routine is part of a driver of the marking device, the driver being a set of configuration commands that are associated with the marking device and the marking device's capabilities.

4. The system of claim 3, wherein the blank page indicating routine includes a user answerable option to automatically mark the blank page as intentionally blank, the user's answer to the option being stored in the driver for all future documents.

5. The system of claim 1, wherein the blank page indicating routine includes a user answerable option to automatically mark the blank page as intentionally blank, the user's answer to the option being stored by the blank page indicating routine for all future documents.

6. The system of claim 1, wherein the blank page indicating routine includes a user answerable option to mark the blank page as intentionally blank, the user answerable option being presented to the user when the document is saved or printed.

7. The system of claim 1, wherein the blank page indicating routine is part of a driver associated with a marking device, the driver being a set of configuration commands that are associated with the marking device and the marking device's capabilities.

8. The system of claim 1, wherein the marking device and the processor are parts of a photocopier, and
the photocopier scans the document in physical form and converts it to the electronic form.

9. The system of claim 8, wherein the blank page indicating routine includes a user answerable option to automatically mark the blank page as intentionally blank, the user's answer to the option being stored by the blank page indicating routine for all future documents.

10. The system of claim 8, wherein the blank page indicating routine includes a user answerable option to mark the blank page as intentionally blank, the user answerable option being presented to the user each time a document is copied.

11. A method for marking intentionally blank pages in a document, the method comprising:
processing a document in an electronic form with a processor;
detecting a blank page in the document with a blank page detection routine that is run by the processor;
determining in response to a detected blank plank page in the document whether the detected blank page will be marked as intentionally left blank;
causing the processor to run a blank page indicating routine, in response to the determination that the detected blank page will be marked as intentionally left blank, to cause an indication on the document that the blank page is an intentionally blank page,
wherein the indication is configured to be read by a marking device such that the marking device marks the blank page as intentionally blank; and
wherein the processor submits the detected blank page devoid of an indication that the marking device mark the blank page as an intentionally blank page when a determination is made that the detected blank plank page will not be marked as intentionally left blank.

12. The method of claim 11, further comprising marking the blank page as intentionally blank with the marking device.

13. The method of claim 12, wherein the blank page indicating routine is part of a driver of the marking device, the driver being a set of configuration commands that are associated with the marking device and the marking device's capabilities.

14. The method of claim 13, wherein the blank page indicating routine includes a user answerable option to automatically mark the blank page as intentionally blank, the user's answer to the option being stored in the driver for all future documents.

15. The method of claim 11, wherein the blank page indicating routine includes a user answerable option to automatically mark the blank page as intentionally blank, the user's answer to the option being stored by the blank page indicating routine for all future documents.

16. The method of claim 11, wherein the blank page indicating routine includes a user answerable option to mark the blank page as intentionally blank, the user answerable option being presented to the user when the document is saved or printed.

17. The method of claim 11, wherein the blank page indicating routine is part of a driver associated with a marking device, the driver being a set of configuration commands that are associated with the marking device and the marking device's capabilities.

18. The method of claim 11, wherein the marking device and the processor are parts of a photocopier, and the method further comprises the photocopier scanning the document in physical form and converting it to the electronic form.

19. The method of claim 18, wherein the blank page indicating routine includes a user answerable option to automatically mark the blank page as intentionally blank, the user's answer to the option being stored by the blank page indicating routine for all future documents.

20. The method of claim 18, wherein the blank page indicating routine includes a user answerable option to mark the blank page as intentionally blank, the user answerable option being presented to the user each time a document is copied.

* * * * *